United States Patent [19]

Reischl et al.

[11] 4,324,716

[45] Apr. 13, 1982

[54] SOLUTIONS OF POLYISOCYANATE POLYADDITION PRODUCTS

[75] Inventors: Artur Reischl, Leverkusen; Gert Jabs, Cologne, both of Fed. Rep. of Germany

[73] Assignee: Bayer Aktiengesellschaft, Leverkusen, Fed. Rep. of Germany

[21] Appl. No.: 209,633

[22] Filed: Nov. 24, 1980

Related U.S. Application Data

[63] Continuation of Ser. No. 968,240, Dec. 11, 1978, abandoned, which is a continuation of Ser. No. 827,292, Aug. 24, 1977, abandoned.

[30] Foreign Application Priority Data

Aug. 27, 1976 [DE] Fed. Rep. of Germany ....... 2638759

[51] Int. Cl.$^3$ ..................... C08G 18/32; C08G 18/14; C08K 5/05; C08K 5/06
[52] U.S. Cl. ................................ 524/761; 521/117; 521/158; 521/163; 521/164; 524/762; 524/765; 524/767; 524/839; 524/874
[58] Field of Search ................... 260/33.4 UR, 33.2 R

[56] References Cited

U.S. PATENT DOCUMENTS

| | | | |
|---|---|---|---|
| 2,917,471 | 12/1959 | Nelson | 260/2.3 |
| 3,264,134 | 8/1966 | Vill | 260/33.4 UR |
| 3,300,417 | 1/1967 | McElroy | 260/2.3 |
| 3,373,143 | 3/1968 | Chilvers et al. | 260/75 |
| 3,373,143 | 3/1968 | Chilvers et al. | 260/75 |
| 3,503,934 | 3/1970 | Chilvers | 260/75 |
| 3,983,087 | 9/1976 | Tucker | 260/2.3 |
| 4,014,809 | 3/1977 | Kondo | 260/2.3 |
| 4,093,569 | 6/1978 | Reischl et al. | 260/33.4 UR |
| 4,184,990 | 1/1980 | Reischl et al. | 260/33.4 UR |

FOREIGN PATENT DOCUMENTS

| | | |
|---|---|---|
| 1168075 | 4/1964 | Fed. Rep. of Germany . |
| 1260142 | 2/1968 | Fed. Rep. of Germany . |
| 2513815 | 9/1976 | Fed. Rep. of Germany . |
| 2550796 | 5/1977 | Fed. Rep. of Germany . |
| 2550797 | 6/1977 | Fed. Rep. of Germany . |

Primary Examiner—H. S. Cockeram
Attorney, Agent, or Firm—Gene Harsh; Joseph C. Gil; Richard A. Elder

[57] ABSTRACT

This invention relates to solutions of polyisocyanate polyaddition products with a solids content of from 5 to 70% by weight of A. Reaction products of
  (a) polyisocyanates,
  (b) hydrazines and/or polyamines and/or dihydrazides and/or ammonia and/or urea and/or low molecular weight polyols,
  (c) optionally higher molecular weight polyols and
  (d) optionally formaldehyde in
B. polyhydric alcohols having a molecular weight of between 62 and 450.

4 Claims, No Drawings

SOLUTIONS OF POLYISOCYANATE POLYADDITION PRODUCTS

This is a continuation of application Ser. No. 968,240, filed Dec. 11, 1978 which itself is a continuation of application Ser. No. 827,292, filed Aug. 24, 1977, now abandoned.

BACKGROUND OF THE INVENTION

Diisocyanate polyaddition products dispersed in polyethers or polyesters are already known. According to German Auslegeschrift No. 1,168,075, diisocyanates are reacted with difunctional primary alcohols in a polyether or polyester having a molecular weight 500 to 3000 used as dispersing medium, said polyether or polyester having at least two exclusively secondary, hydroxyl groups in the molecule. According to German Auslegeschrift No. 1,260,142, compounds containing isocyanate groups and amino groups are subjected to polyaddition in situ in a polypropylene glycol ether used as dispersing medium. An improvement to the above mentioned processes is described in German Offenlegungsschrift No. 2,513,815, according to which the in situ polyaddition reaction is carried out continuously in a through-flow mixer. The resulting dispersion of polyurethanes, polyureas or polyhydrazodicarbonamides in polyvalent, higher molecular weight compounds containing hydroxyl groups can be used as modified polyol components containing fillers for the production of polyurethane resins.

According to two earlier proposals by the present Applicants in German Offenlegungsschriften Nos. 2,550,796 and 2,550,797, stable dispersions of polyisocyanate polyaddition products in dispersing agents consisting of hydroxyl containing compounds are obtained by in situ reaction of polyisocyanates with amino functional compounds which may contain ionic groups in the dispersing medium, the reaction being carried out in the presence of water. Both of these earlier applications, however, are also confined to the preparation and use of dispersions.

DESCRIPTION OF THE INVENTION

It has now surprisingly been found that polyisocyanate polyaddition products form clear, stable solutions in low molecular weight polyhydric alcohols, elevated temperatures being required in some cases.

The present invention thus relates to solutions having a solids content of between 5 and 70% by weight comprising:
1. reaction products which may contain ionic groups of
   (a) polyisocyanates,
   (b) hydrazines and/or dihydrazides and/or ammonia and/or urea and/or low molecular weight polyols,
   (c) optionally additional higher molecular weight polyols and optionally
   (d) formaldehyde in
2. polyhydric alcohols having a molecular weight of between 62 and 450.

The present invention relates also to a process for the preparation of polyurethane resins by the reaction of polyisocyanates with polyhydroxyl compounds, optionally other compounds which are reactive with isocyanates and optionally blowing agents, catalysts and other additives, characterized in that the polyhydroxyl compounds used are the solutions according to the invention.

According to the invention, it is preferred to use solutions of ionic polyureas, of polyhydrazodicarbonamides, of reaction products of ammonia, formaldehyde and polyisocyanates and of reaction products of polyisocyanates and low molecular weight polyhydric alcohols.

According to the invention, the solvents used for the polyisocyanate polyaddition products are polyhydric alcohols having a molecular weight of between 62 and 450, preferably between 62 and 200. Glycols and mixtures of glycols are preferred according to the invention. Examples of suitable solvents for the purpose of the invention include ethylene glycol; diethylene glycol; triethylene glycol; tetraethylene glycol and polyethylene glycols with molecular weights of up to 450; propylene glycol-(1,2) and -(1,3); dipropylene glycol; polypropylene glycols with molecular weights of up to 450; butylene glycol-(1,4) and -(2,3); dibutylene glycol; thiodiglycol; 1,4-bis-hydroxymethylcyclohexane; 2-methyl-1,3-propanediol; glycerol; trimethylolpropane; butanetriol-(1,2,4); trimethylolethane and alkoxylated low molecular weight polyols. Among the dihydric alcohols, ethylene glycol, diethylene glycol, propanediol and butanediol are particularly preferred. Among the trihydric alcohols, glycerol and ethoxylated and/or propoxylated trimethylolpropane are preferred.

For the purpose of this invention, the term "solution" is also used to include mixtures of polyisocyanate polyaddition products in a low molecular weight alcohol which are obtained as homogeneous solutions only when heated but are in the form of dispersions, pastes or waxes at room temperature. The term "solution" is also used to include transparent, homogeneous gels. "Solution" means a clear, uniform and homogeneous mixture of polyaddition product and dispersing agent and is to be distinguished from stable dispersions such as those mentioned above which are described in German Offenlegungssschriften Nos. 2,550,796 and 2,550,797.

The polyisocyanates used for preparing the polyisocyanate polyaddition products contained in the solutions according to the invention may be aliphatic, cycloaliphatic, araliphatic, aromatic or heterocyclic polyisocyanates such as those described, for example, by W. Siefken in Justus Liebigs Annalen der Chemie, 562, pages 75 to 136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethylcyclohexane as described in German Auslegeschrift No. 1,202,785 and U.S. Pat. No. 3,401,190; hexahydrotolylene-2,4-diisocyanate and -2,6-diisocyanate and any mixtures of these isomers; hexahydrophenylene-1,3-diisocyanate and/or 1,4-diisocyanate; perhydrodiphenylmethane-2,4'-diisocyanate and/or 4,4'-diisocyanate; phenylene-1,3-diisocyanate and -1,4-diisocyanate; tolylene-2,4-diisocyanate and -2,6-diisocyanate and any mixtures of these isomers diphenylmethane-2,4'-diisocyanate and-/or 4,4'-diisocyanate; naphthylene-1,5-diisocyanate; triphenylmethane-4,4',4''-triisocyanate; polyphenyl-polymethylene polyisocyanates which can be obtained by aniline-formaldehyde condensation followed by phosgenation and which have been described, for example, in British Pat. Nos. 874,430 and 848,671; m- and p-isocyanatophenylsulphonyl isocyanates according to U.S. Pat. No. 3,454,606; perchlorinated aryl polyisocyanates such as those described, for example, in German Auslegeschrift No. 1,157,601 (U.S. Pat. No. 3,277,138); polyisocyanates having carbodiimide groups as described in German Pat. No. 1,092,007 (U.S. Pat. No. 3,152,162); diisocyanates of the kind described in U.S. Pat. No. 3,492,330; polyisocyanates with allophanate groups as described e.g. in British Pat. No. 994,890; Belgian Pat. No. 761,626 and published Dutch patent application No. 7,102,524; polyisocyanates with isocyanurate groups, e.g. as described in U.S. Pat. No. 3,001,973; German Pat. Nos. 1,022,789; 1,222,067 and 1,027,394 and in German Offenlegungsschriften Nos. 1,929,034 and 2,004,048; polyisocyanates with urethane groups as described e.g. in Belgian Pat. No. 752,261 or U.S. Pat. No. 3,394,164; polyisocyanates with acylated urea groups according to German Pat. No. 1,230,778; polyisocyanates with biuret groups as described e.g. in German Pat. No. 1,101,394; U.S. Pat. Nos. 3,124,605 and 3,201,372 and in British Pat. No. 889,050; polyisocyanates prepared by telomerization reactions as described, for example, in U.S. Pat. No. 3,654,106; polyisocyanates having ester groups such as those mentioned, for example, in British Pat. Nos. 965,474 and 1,072,956; U.S. Pat. No. 3,567,763 and German Pat. No. 1,231,688; reaction products of the above mentioned isocyanates with acetals according to German Pat. No. 1,072,385 and polyisocyanates containing polymeric fatty acid groups according to U.S. Pat. No. 3,455,883.

The distillation residues obtained from the commercial production of isocyanates and still containing isocyanate groups may also be used, optionally as solutions in one or more of the above mentioned polyisocyanates. Any mixtures of the above mentioned polyisocyanates may also be used.

Minor quantities of monoisocyanates may also be used, especially in combination with polyfunctional isocyanates, for example with tri- or tetra-functional isocyanates.

The preferred isocyanates for the preparation of polyadducts containing ionic groups are tolylene diisocyanates; diphenylmethane diisocyanates; hexamethylene diisocyanate; 1-isocyanato-3,3,5-trimethyl-5-isocyanatomethylcyclohexane and mixtures of these isocyanates. 2,4- and/or 2,6-tolylene diisocyanate are particularly preferred for the preparation of non-ionic polyadducts.

Starting components which may also be used as part or all of the isocyanate component but are generally less preferred according to the invention are the so-called isocyanate prepolymers, that is to say reaction products with isocyanate end groups obtained from higher molecular weight and/or lower molecular weight compounds having at least two hydrogen atoms reactive with isocyanate and an excess of polyisocyanate. Apart from compounds containing amino groups, thiol groups or carboxyl groups, the higher molecular weight compounds (molecular weight approximately 400 to 12000) containing at least two hydrogen atoms capable of reacting with isocyanates are preferably polyhydroxyl compounds, in particular compounds having from 2 to 8 hydroxyl groups, especially those with molecular weights of from 500 to 10,000, preferably 500 to 2000. These include polyesters, polyethers, polythioethers, polyacetals, polycarbonates and polyester amides containing at least 2, generally 2 to 8 and preferably 2 to 4 hydroxyl groups and having a molecular weight of from 500 to 10,000, preferably 500 to 2000, such as the polyhydroxyl compounds known per se for the preparation of both homogeneous and cellular polyurethanes.

Suitable polyesters with hydroxyl groups include e.g. the reaction products of polyvalent, preferably divalent alcohols, to which trivalent alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or unsaturated.

The following are mentioned as examples: Succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid which may be mixed with monomeric fatty acids; dimethyl terephthalate and terephthalic acid-bis-glycol esters. The following are examples of suitable polyvalent alcohols: Ethylene glycol; propylene glycol-(1,2) and -(1,3); butylene glycol-(1,4) and -(2,3); hexanediol-(1,6); octanediol-(1,8); neopentylglycol; cyclohexanedimethanol (1,4-bis-hydroxymethylcyclohexane); 2-methyl-1,3-propanediol; glycerol; trimethylolpropane; hexanetriol-(1,2,6); butanetriol-(1,2,4); trimethylolethane; pentaerythritol; quinitol; mannitol and sorbitol; methylglycoside; diethylene glycol; triethylene glycol; tetraethylene glycol; polyethylene glycols; dipropylene glycol; polypropylene glycols, dibutylene glycol and polybutylene glycols. The polyesters may also contain a proportion of carboxyl end groups. Polyesters of lactones such as $\epsilon$-caprolactone or hydroxycarboxylic acid such as $\omega$-hydroxycaproic acid may also be used.

The polyesters used according to the invention which have at least 2, generally 2 to 8 and preferably 2 to 3 hydroxyl groups are also known per se. They are prepared, for example, by polymerization of epoxides such as ethylene oxide, propylene oxide, butylene oxide, tetrahydrofuran, styrene oxide or epichlorohydrin, either each on its own, e.g. in the presence of boron trifluoride, or by addition of these epoxides, either as mixtures or successively, to starting components having reactive hydrogen atoms, such as water, alcohols or amines, e.g. ethylene glycol, propylene glycol-(1,3), or -(1,2), trimethylolpropane, 4,4'-dihydroxydiphenylpropane, aniline, ethanolamine or ethylene diamine. Sucrose polyethers may also be used according to the invention, e.g. those described in German Auslegeschriften Nos. 1,176,358 and 1,064,938. It is in many cases preferred to use polyethers which contain predominantly primary hydroxyl groups (up to 90% by weight, based on all the hydroxyl groups present in the polyether). Polyethers modified with vinyl polymers, e.g. the compounds obtained by polymerization of styrene or acrylonitrile in the presence of polyethers as described in U.S. Pat. Nos. 3,383,351; 3,304,273; 3,523,093 and 3,110,695 and German Pat. No. 1,152,536, as well as polybutadienes which have hydroxyl groups, are also suitable.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythiomixed ethers, polythioether esters or polythioether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example those which can be prepared by the reaction of diols such as propanediol-(1,3), butanediol-(1,4), and/or hexanediol-(1,6), diethylene glycol, triethylene glycol or tetraethylene glycol with diarylcarbonates, e.g. with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products of alkylene oxides and phenol formaldehyde resins or of alkylene oxides and urea formaldehyde resins are also suitable for the purpose of the invention.

Representatives of these compounds which may be used according to the invention have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964 pages 5–6 and 198–199 and In Kunststoff-Handbuch, Volume VII, Vieweg-Höchtlen, Carl-Hanser-Verlag, Munich, 1966, e.g. on pages 45 to 71.

Mixtures of the above mentioned compounds which contain at least two hydrogen atoms capable of reacting with isocyanates and have a molecular weight of from 400 to 10,000 may, of course, also be used, e.g. especially mixtures of polyethers and polyesters.

The starting components used for the preparation of isocyanate prepolymers may also include compounds with a molecular weight of from 32 to 400 which have at least two hydrogen atoms capable of reacting with isocyanates. These compounds are also understood to be compounds containing hydroxyl groups and/or carboxyl groups, preferably hydroxyl groups and/or amino groups, of the kind already known as chain lengthening agents or cross-linking agents. They generally have from 2 to 8 hydrogen atoms capable of reacting with isocyanates, preferably 2 or 3 such hydrogen atoms.

The following are examples of such compounds: Ethylene glycol; propylene glycol-(1,2) and -(1,3); butylene glycol-(1,4) and -(2,3); pentanediol-(1,5); hexanediol-(1,6), octanediol-(1,8); neopentyl glycol; 1,4-bis-hydroxymethylcyclohexane; 2-methyl-1,3-propanediol; glycerol, trimethylol propane; hexanetriol-(1,2,6); trimethylolethane; pentaerythritol; quinitol, mannitol and sorbitol; diethylene glycol; triethylene glycol; tetraethylene glycol; polyethylene glycols with a molecular weight of up to 400; dipropylene glycol; polypropylene glycols with a molecular weight of up to 400; dibutylene glycol; polybutylene glycols with a molecular weight of up to 400; 4,4'-dihydroxy-diphenyl propane; dihydroxymethyl-hydroquinone; ethanolamine; diethanolamine; triethanolamine; 3-aminopropanol; ethylene diamine; 1,3-diaminopropane; 1-mercapto-3-aminopropane; 4-hydroxyphthalic acid; 4-aminophthalic acid; succinic acid; adipic acid; hydrazine; N,N-dimethylhydrazine; 4,4'-diaminodiphenylmethane; tolylene diamine; methylene-bis-chloroaniline; methylene-bis-anthranilic acid ester; diaminobenzoic acid ester and the isomeric chlorophenylenediamines.

In this case again there may be used mixtures of various compounds having a molecular weight of from 32 to 400 and containing at least two hydrogen atoms capable of reacting with isocyanates.

As already mentioned above, ionic polyisocyanate polyaddition products are preferred for the purpose of the invention because they are exceptionally soluble in low molecular weight polyhydric alcohols. For obtaining polyadducts with ionic groups, the compounds (a) or (b) used for their synthesis must contain at least one isocyanate group or at least one hydrogen atom reactive with isocyanate groups and at least one ionic group or group capable of salt formation. The following are compounds which may be used for this purpose, optionally as mixtures:

I. Compounds containing basic amino groups which can be neutralized with aqueous acids or tertiary amino groups which can be quaternized:

(a) Alcohols, in particular alkoxylated aliphatic, cycloaliphatic, aromatic and heterocyclic secondary amines, e.g. N,N-dimethylethanolamine; N,N-diethylethanolamine; N,N-dibutylethanolamine; 1-dimethylaminopropanol-(2); N,N-methyl-β-hydroxyethylaniline; N,N-methyl-β-hydroxypropyl-aniline; N,N-ethyl-β-hydroxyethylaniline; N,N-butyl-β-hydroxyethylaniline; N-oxethylpiperidine; N-oxethylmorpholine; α-hydroxyethylpyridine and γ-hydroxyethyl-quinoline.

(b) Diols and triols, in particular alkoxylated aliphatic, cycloaliphatic, aromatic and heterocyclic primary amines, e.g. N-methyl-diethanolamine, N-butyl-diethanolamine, N-oleyl-diethanolamine, N-cyclohexyl-diethanolamine, N-methyl-diisopropanolamine, N-cyclohexyl-diisopropanolamine, N,N-dioxethylaniline, N,N-dioxethyl-m-toluidine, N,N-dioxethyl-p-toluidine, N,N-dioxypropyl-naphthylamine, N,N-tetraoxethyl-α-aminopyridine, dioxethylpiperazine, polyethoxylated butyl diethanolamine, polypropoxylated methyl diethanolamine (molecular weight 1000), polypropoxylated methyl diethanolamine (molecular weight 2000), polyesters containing tert. amino groups, tri-[2-hydroxypropyl-(1)]-amine, N,N-di-n-(2,3-dihydroxypropyl)-aniline, N,N'-dimethyl-N,N'-bisoxethylhydrazine and N,N'-dimethyl-N,N'-bis-oxypropylethylenediamine.

(c) Amino alcohols, e.g. addition products of alkylene oxide and acrylonitrile with primary amines obtained by hydrogenation, such as N-methyl-N-(3-aminopropyl)-ethanolamine, N-cyclohexyl-N-(3-aminopropyl)-propanol-(2)-amine, N,N-bis-(3-aminopropyl)-ethanolamine and N-3-aminopropyl-diethanolamine.

(d) Amines, e.g. N,N-dimethyl-hydrazine, N,N-dimethyl-ethylenediamine, 1-di-ethylamino-4-aminopentane, α-aminopyridine, 3-amino-N-ethylcarbazole, N,N-dimethyl-propylenediamine, N-aminopropylpiperidine, N-aminopropyl-morpholine, N-aminopropylethyleneimine and 1,3-bis-piperidino-2-aminopropane.

(e) Diamines, triamines and amides, in particular those obtained by hydrogenation of addition products of acrylonitrile with primary or disecondary amines, e.g. bis-(3-aminopropyl)-methylamine, bis-(3-aminopropyl)cyclohexylamine, bis-(3-aminopropyl)-aniline, bis-(3-aminopropyl)-toluidine, diaminocarbazole, bis-(aminopropoxyethyl)butylamine, tris-(aminopropyl)-amine or N,N'-bis-carbonamidopropyl-hexamethylenediamine as well as compounds obtained by addition of acrylamide to diamines or diols.

II. Compounds containing halogen atoms which are capable of quaternization reactions or the corresponding esters of strong acids:

2-Chloroethanol, 2-bromoethanol, 4-chlorobutanol, 3-bromopropanol, β-chloroethylamine, 6-chlorohexylamine, ethanolamine sulphuric acid ester, N,N-bis-hydroxyethyl-N'-m-chloromethyl-phenylurea, N-hydroxyethyl-N'-chlorohexylurea, glycerolamino chloroethyl urethane, chloroacetyl ethylene diamine, bromoacetyl dipropylene triamine, trichloroacetyl-triethylene tetramine, glycerol-α-bromohydrin, polypropoxylated glycerol-α-chlorohydrin, polyesters having aliphatically bound halogen or 1,3-dichloro-propanol-2.

The following are examples of suitable isocyanates: Chlorohexylisocyanate, m-chlorophenyl isocyanate, p-chlorophenylisocyanate, bis-chloromethyl-diphenylmethane diisocyanate, 2,4-diisocyanatobenzyl chloride, 2,6-diisocyanatobenzyl chloride, and N-(4-methyl-3-isocyanatophenyl)-β-bromoethylurethane.

III. Compounds having carboxylic acid or hydroxyl groups capable of salt formation:

(a) Hydroxy and mercapto carboxylic acids:

Glycollic acid, thioglycollic acid, lactic acid, trichlorolactic acid, malic acid, dihydroxymaleic acid, dihydroxy fumaric acid, tartaric acid, dihydroxytartaric acid, mucic acid, saccharic acid, citric acid, glyceroboric acid, pentaerythritoboric acid, mannitoboric acid, salicyclic acid, 2,6-dihydroxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, hydroxyterephthalic acid, 5,6,7,8-tetrahydro-napthol-(2)-carboxylic acid-(3), 1-hydroxynapthoic acid-(2), 2,8-dihydroxynaphthoic acid-(3), β-hydroxypropionic acid, m-hydroxybenzoic acid, pyrazolone carboxylic acid, uric acid, barbituric acid, resols and other phenolformaldehyde condensation products.

(b) Polycarboxylic acids:

Sulphone diacetic acid, nitrilo triacetic acid, ethylene diaminotetracetic acid, diglycollic acid, thiodiglycollic acid, methylene-bis-thioglycollic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, naphthalene-1,4,5,8-tetracarboxylic acid, o-tolylimidodiacetic acid, β-naphthylimido-diacetic acid, pyridino dicarboxylic acid and dithiodipropionic acid.

(c) Aminocarboxylic acids:

Oxaluric acid; anilino acetic acid; 2-hydroxy-carbazolecarboxylic acid-(3); glycine; sarcosine; methionine; α-alanine; β-alanine; 6-aminocaproic acid; 6-benzoylamino-2-chlorocaproic acid; 4-aminobutyric acid; aspartic acid; glutamic acid; histidine; anthranilic acid; 2-ethylaminobenzoic acid; N-(2-carboxyphenyl)-aminoacetic acid, 2-(3'-amino-benzenesulphonylamino)-benzoic acid, 3-aminobenzoic acid, 4-aminobenzoic acid, N-phenylaminoacetic acid, 3,4-diaminobenzoic acid, 5-aminobenzenedicarboxylic acid and 5-(4'-aminobenzoylamino)-2-aminobenzoic acid.

(d) Hydroxysulphonic and carboxysulphonic acids:

2-Hydroxyethanesulphonic acid, phenolsulphonic acid-(2), phenolsulphonic acid-(3), phenolsulphonic acid-(4), phenoldisulphonic acid-(2,4), sulphacetic acid, m-sulphobenzoic acid, p-sulphobenzoic acid, benzoic acid-(1)-disulphonic acid-(3,5), 2-chlorobenzoic acid-(1)-sulphonic acid-(4), 2-hydroxy-benzoic acid-(1)-sulphonic acid-(5), naphthol-(1)-sulphonic acid, naphthol-(1)-disulphonic acid, 8-chloronaphthol-(1)-disulphonic acid, naphthol-(1)-trisulphonic acid, naphthol-(2)-sulphonic acid-(1), naphthol-(2)-trisulphonic acid, 1,7-dihydroxy-naphthalenesulphonic acid-(3), 1,8-dihydroxy-naphthalene-disulphonic acid-(2,4), chromotropic acid, 2-hydroxynaphthoic acid-(3)-sulphonic acid-(6) and 2-hydroxycarbazole-sulphonic acid-(7).

(e) Aminosulphonic acids:

Amidosulphonic acid, hydroxylamine monosulphonic acid, hydrazinodisulphonic acid, sulphanilic acid, N-phenylaminomethanesulphonic acid, 4,6-dichloroaniline-sulphonic acid-(2) phenylenediamine-(1,3)-disulphonic acid-(4,6), N-acetyl-naphtyhylamine-(1)-sulphonic acid-(3), naphthylamine-(1)-sulphonic acid, naphthylamine-(2)-sulphonic acid, naphthylamine-disulphonic acid, naphthylamine-trisulphonic acid, 4,4'-di-(p-aminobenzoylamino)-diphenylurea-disulphonic acid-(3,3'), phenylhydrazine-disulphonic acid-(2,5), 2,3-dimethyl-4-aminoazobenzene-disulphonic acid-(4',5), 4'-aminostilbene-disulphonic acid-(2,2')-4-azo-4-anisole, carbazole-disulphonic acid-(2,7), taurine, methyltaurine, butyltaurine, 3-aminobenzoic acid-(1)-sulphonic acid-(5), 3-aminotoluene-N-methane sulphonic acid, 6-nitro-1,3-dimethylbenzene-4-sulphonic acid, 4,6-diaminobenzenedisulphonic acid-(1,3), 2,4-diaminotoluene-sulphonic acid-(5), 4,4'-diaminodiphenyl-disulphonic acid-(2,2'), 2-aminophenol-sulphonic acid-(4), 4,4'-diaminodiphenylethersulphonic acid-(2), 2-aminoanisole-N-methanesulphonic acid, 2-aminodiphenylamine-sulphonic acid.

The salt forming agents used for the compounds of Group I may be inorganic or organic acids or compounds having reactive halogen atoms or the corresponding esters of strong acids. The following are examples of such compounds: Hydrochloric acid; nitric acid; hypophosphorous acid; amido-sulphonic acid; hydroxylamine monosulphonic acid; formic acid; acetic acid; glycollic acid; lactic acid; chloroacetic acid; ethyl bromoacetate; sorbitoboric acid; methyl chloride; butyl bromide; dimethylsulphate; diethylsulphate; benzyl chloride; p-toluene-sulphonic acid methyl ester; methyl bromide; ethylene chlorohydrin; ethylene bromohydrin; glycerol-α-bromohydrin; ethyl chloroacetate; chloroacetamide; bromoacetamide; dibromoethane; chlorobromobutane; dibromobutane; ethylene oxide; propylene oxide and 2,3-epoxypropanol.

The compounds of Group II may be quaternized or ternized with tertiary amines but also with sulphides or phosphines. Quaternary ammonium and phosphonium salts or ternary sulphonium salts are obtained.

Examples include, among others, trimethylamine; triethylamine; tributylamine; pyridine; triethanolamine; the compounds listed in Groups Ia and Ib mentioned above; dimethyl sulphide, diethyl sulphide; thiodiglycol; thiodiglycollic acid; trialkylphosphines; alkylarylphosphines and triaryl phosphines.

Suitable salt forming agents for compounds of the Group III are inorganic and organic bases such as sodium hydroxide, potassium hydroxide, potassium carbonate, sodium bicarbonate, ammonia and primary, secondary and tertiary amines. Lastly, it should be mentioned that organic phosphorus compounds may also be used for salt formation, including basic phosphines which can be built into the molecule such as diethyl-β-hydroxyethylphosphine, methylbis-β-hydroxyethylphosphine, and tris-β-hydroxymethylphosphine as well as derivatives such as phosphinic acids, phosphonous acids, phosphonic acids and esters of phosphorous and of phosphoric acid and their thioanalogues, e.g. bis(α-hydroxy-isopropyl)-phosphinic acid, hydroxyalkane phosphonic acid or phosphoric acid-bis-glycol ester.

Those ionogenic components which carry sulphonate, carboxylate and/or ammonium groups are preferred according to the invention.

When preparing anionic polyadducts, ionification of the products of the process is most simply carried out by reacting the salts, for example sulphonates or carboxylates which contain groups capable of reacting with isocyanates, with polyisocyanates in the polyol. Salts may either be added in the form of dilute aqueous solutions or the pure salt may be dissolved in the polyol with the addition of water. Alternatively, the free acid may be stirred into the polyol and aqueous alkali may then be stirred in until the reaction mixture is neutral.

Cationic dispersions, for example products of the process containing quaternary nitrogen, may be prepared, for example, as follows: A polyisocyanate polyaddition product containing a tertiary nitrogen is first synthesized in the polyol by the process according to German Offenlegungsschrift No. 2,550,797. The water is then completely distilled off and the reaction product methylated, for example with the equivalent or less than equivalent quantity of dimethylsulphate. Instead of using organic alkylating agents, cationic groups may be formed subsequently by means of organic acids or mineral acids, if desired in the presence of water.

In some cases, it may be advantageous to introduce the inorganic components in the form of a preadduct, i.e. for example a hydroxyl compound containing ionic groups or groups capable of salt formation may first be reacted with an excess of polyisocyanate, the resulting ionogenic prepolymer being then used as the isocyanate component (optionally with the addition of non-ionogenic isocyanates) in the synthesis of the polyadduct. Conversely, ionogenic isocyanates could, of course, be reacted with an excess of a polyamine to form a preliminary product which is then reacted with additional isocyanate.

The total quantity of ionogenic components (i.e. salts and compounds capable of salt formation) is generally calculated so that the polyisocyanate polyaddition product finally obtained contains from 0.5 to 0.001, preferably 0.25 to 0.01, equivalents of ionic groups per 100 g of solid material.

If the compounds which contain salt groups or are capable of salt formation are at least bifunctional, they may be used as the sole component for synthesizing the polyadduct. If, on the other hand, they are only monofunctional, they should be used in combination with components which are more than difunctional in order that sufficiently high molecular weights may be obtained.

According to the invention, however, non-ionic polyisocyanate polyaddition products may also be dissolved in low molecular weight polyhydric alcohols. The isocyanate reactive components used for their synthesis may be polyamines, hydrazines, hydrazides, low molecular weight polyols, ammonia or mixtures of ammonia and/or urea and formaldehyde. Suitable low molecular weight polyols have already been described in detail above.

Suitable polyamines include divalent and/or higher valent primary and/or secondary aliphatic, araliphatic, cycloaliphatic and aromatic amines, e.g. ethylene diamine; 1,2- and 1,3-propylene diamine; tetramethylene diamine; hexamethylene diamine; dodecamethylene diamine; trimethyl diaminohexane; N,N'-dimethylethylenediamine; 2,2'-bisaminopropyl-methylamine; higher homologues of ethylene diamine, such as diethylene triamine, triethylene tetramine and tetraethylene pentamine; homologues of propylene diamine, such as dipropylene triamine, piperazine, N,N'-bis-aminoethylpiperazine, triazine, 4-aminobenzylamine, 4-aminophenyl ethylamine, 1-amino-3,3,5-trimethyl-5-aminomethylcyclohexane, 4,4'-diaminodicyclohexyl-methane and -propane, 1,4-diaminocyclohexane, phenylenediamines, naphthylene diamines; condensates of aniline and formaldehyde; tolylene diamines; the bis-aminomethylbenzenes and derivatives of the above mentioned aromatic amines monoalkylated on one or both nitrogen atoms. The polyamines generally have a molecular weight of from 60 to 10,000, preferably 60 to 1000 and most preferably 60 to 200.

The hydrazines used may be hydrazine itself or monosubstituted or N,N'-disubstituted hydrazines. The substituents may be $C_1$ to $C_6$ alkyl groups, cyclohexyl groups or phenyl groups. The hydrazines generally have a molecular weight of from 32 to 200. Hydrazine itself is particularly preferred.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid, and terephthalic acid; the esters of a hydrazine monocarboxylic acid with dihydric or higher hydric alcohols and phenols such as ethanediol, propane-1,2-diol, butane-1,2-diol, -1,3-diol and -1,4-diol, hexanediol, diethyleneglycol, triethyleneglycol, tetraethyleneglycol, dipropyleneglycol, tripropyleneglycol and hydroquinone; and the amides of hydrazinomonocarboxylic acid (semicarbazides), e.g. with the above mentioned diamines and polyamines. The hydrazides generally have a molecular weight of from 90 to 10,000, preferably 90 to 1000 and most preferably 90 to 500.

In special cases, a proportion of isocyanates or amines, hydrazines and hydrazides which have a functionality higher than 2 may also be used, especially in combination with the corresponding monofunctional compounds.

The polyaddition products which are dissolved in hydroxyl compounds in accordance with the invention may also be modified by the addition of a proportion of ionogenic or, as already mentioned above, non-ionogenic monofunctional isocyanates, amines, hydrazine derivatives or ammonia. Thus, for example, the average molecular weight of the polyaddition products can be adjusted as desired by the incorporation of such monofunctional compounds. By using alkanolamines having primary or secondary amino groups, it is possible to synthesize polyureas and polyurea polyhydrazodicarbonamides which have free hydroxyl groups. Other groups, e.g. ester groups, longer chain aliphatic groups, tertiary amino groups and active double bonds can also be introduced by the addition of suitably substituted monoamines and diamines or isocyanates.

Non-ionogenic monofunctional isocyanates include, for example, alkylisocyanates such as methyl, ethyl, isopropyl, isobutyl, hexyl, lauryl and stearylisocyanate; chlorohexylisocyanate; cyclohexyl isocyanate; phenyl isocyanate; tolyl isocyanate; 4-chloro-phenyl isocyanate and diisopropylphenyl-isocyanate.

Suitable non-ionogenic monoamines include, for example, alkylamines and dialkylamines having from 1 to 18 carbon atoms in the alkyl groups; cycloaliphatic amines such as cyclohexylamine and homologues thereof; aniline, N-alkylanilines and aniline derivatives substituted on the benzene ring; alkanolamines such as ethanolamine, diethanolamine, propanolamine, dipropanolamine, butanolamine and dibutanolamine; and diamines having tertiary and a primary or secondary amino group, e.g. N,N-dimethylethylenediamine and N-methyl-piperazine. Suitable monofunctional hydrazine derivatives and hydrazides include, for example, N,N-dialkylhydrazines, the hydrazides of monocarboxylic acids, hydrazinomonocarboxylic esters of monofunctional alcohols or phenols, and semicarbazides such as methyl, ethyl, propyl, butyl, hexyl, dodecyl, stearyl, phenyl and cyclohexyl semicarbazide.

The molecular weight of the polyaddition products dissolved in hydroxyl compounds in accordance with the invention is determined by the proportion of polyamine, hydrazine, polyol or hydrazide on the one hand to the compounds which may also be included). It is particularly preferred to react approximately equivalent quantities of isocyanates with hydroxyl functional or preferably amino functional compounds in the hydroxyl containing solvent.

The reaction may also be carried out with a limited excess of isocyanate. However, as the amount of excess increases, the products obtained become progressively more viscous, depending on the molecular weight of the solvent, since the polyisocyanate excess reacts with the solvent. On the other hand, a substantial excess of low molecular weight chain lengthening agent such as amine, hydrazine or hydrazide can be used without causing any increase in viscosity. The polyaddition products obtained have reactive end groups and a limited molecular weight. The equivalent ratio of polyisocyanate to chain lengthening agent is generally kept between 0.50 and 1.50 and preferably between 0.90 and 1.10. It is particularly preferred to use substantially equivalent quantities.

As already mentioned above, the solutions according to the invention are preferably obtained directly by in situ preparation of the polyisocyanate polyaddition product, preferably at a temperature of from 10° to 110° C., most preferably 20° to 70° C. (ethylene glycol as a solvent generally requires lower temperatures than other polyol solvents if low viscosity solutions are to be prepared), in the low molecular weight, polyhydric alcohol. The procedure described in German Auslegeschriften Nos. 1,168,075 and 1,260,142 already mentioned above may be used but the procedures according to German Offenlegungsschriften Nos. 2,513,815; 2,550,796 and 2,550,797 are preferred. Alternatively, the polyisocyanate polyaddition product may, of course, be prepared separately, reduced to a powder and then dissolved in the low molecular weight, polyhydric alcohol. This method, although less economical, is always advantageous if component b used for synthesis of the polyisocyanate polyaddition product has a similar or slightly higher reactivity with isocyanates as with the alcohol used as solvent. This separate preparation of the polyisocyanate polyaddition product is carried out by known methods, for example by solvent-free polyaddition or by polyaddition in a suitable inert organic solvent such as toluene, acetone, methyl ethyl ketone, ethyl acetate, methyl glycol acetate, methylene chloride, chlorobenzene, dioxane, tetrahydrofuran or dimethylformamide. If aminofunctional compounds are used for synthesizing the polyisocyanate polyaddition product, the reaction may be carried out in water as reaction medium. The polyurea precipitates from the aqueous phase and the powder obtained after filtration and drying can be dissolved in the low molecular weight polyhydric alcohol at elevated temperatures.

In addition to the polyols and aminofunctional compounds described above, urea may also be used as the isocyanate reactive component for the synthesis of the polyisocyanate polyaddition product in the solvent-free melt phase at temperatures above 130° C. The products obtained in this case are branched polyurethanes containing biuret groups. These are also soluble in the polyhydric, low molecular weight alcohols.

It is surprisingly found that the polyisocyanate polyaddition products described above can in many cases be after-cross-linked with formaldehyde in known manner in the presence of acid or alkaline catalysts without becoming insoluble. This subsequent reaction with formaldehyde is most suitably carried out in the solution of the completed polyisocyanate polyaddition product in the low molecular weight, polyhydric alcohol.

In addition to the polyurethanes, polyurethane ureas, polyureas, polyhydrazodicarbonamides and polybiurets described above, the solid components for the solutions according to the invention may also include reaction products of polyisocyanates with ammonia and optionally formaldehyde. If such components are to be used, it is best to react the polyisocyanate in situ with an aqueous ammonia solution, and optionally other amino functional compounds of the kind described above, in low molecular weight polyhydric alcohols and then remove any water present in known manner. The quantity of polyisocyanate used in this reaction is generally between 0.5 and 2.0 equivalents, preferably 0.9 to 1.5 and most preferably 1.0 equivalents per mol of ammonia. If other aminofunctional compounds are used in addition to ammonia, an additional quantity of polyisocyanate approximately equivalent to these aminofunctional compounds must be used. The resulting bis-ureas or tris-ureas (obtained when trifunctional isocyanates are used) are subsequently converted into high molecular weight polymethylene ureas, preferably by cross-linking with formaldehyde. These polymethylene ureas are also soluble in polyhydric, low molecular weight alcohols. Crosslinking with formaldehyde in the presence of catalytic quantities of acids or alkalies is carried out in known manner as described for example in German Offenlegungsschrift No. 2,324,134. The reaction is generally carried out using about 0.2 to 3 mol, preferably 0.4 to 1.5 mol and most preferably 0.5 to 0.8 mol of formaldehyde per equivalent of urea groups. If desired, the formaldehyde may be introduced into the reaction together with the ammonia solution, but in this case it is necessary to mix all the components together at the same time (low molecular weight, polyhydric alcohols; polyisocyanate; ammonia, formaldehyde) or at least to ensure that the polyisocyanate is introduced into the reaction mixture, which should be kept as cool as possible, immediately after the formaldehyde and ammonia solution has been mixed with the low molecular weight alcohol, i.e. generally before ammonia and formaldehyde have reacted to form urotropine, so that the intermediate products containing amino groups can react with the polyisocyanate.

The solutions according to the invention have a solids content of from 5 to 70% by weight, preferably 10 to 50% by weight. They are clear, stable in storage and have a relatively low viscosity. As already mentioned above, the term "solution" is used for the purpose of this invention to include also systems which constitute clear, stable gels or which are in the form of dispersions at room temperature (possibly as waxes) and become homogeneous and transparent only when heated to about 150° C., preferably about 130° C. and most preferably to temperatures of below 100° C.

The solutions according to the invention serve as modified chain lengthening agents which makes it possible for polyurethane resins with improved mechanical properties to be obtained. They can be used wherever low molecular weight, polyhydric alcohols have previously been used as reactants in the synthesis of polyurethanes. A process for the production of polyurethane resins, including cellular polyurethane resins, using solutions according to the invention, is therefore also an object of the present invention, as already mentioned above.

In addition to the solutions according to the invention the starting components used for the production of polyurethane resins in accordance with the invention also include the polyisocyanates and higher molecular weight compounds with isocyanate reactive groups which have already been mentioned above and optionally low molecular weight amino functional compounds which have also already been mentioned above. Both homogeneous polyurethane elastomers, lacquers or adhesives and polyurethane foams can be produced with improved physical properties in accordance with the invention. In many cases, it is difficult or even impossible to produce polyurethane foams, and particularly foams in the range of soft to semi-rigid, when low molecular weight glycols such as mono- or diethylene glycol are used as chain lengthening agents. In the process according to the invention, on the other hand, no problems arise when low molecular weight polyhydric alcohols are used in the form of the solutions described for modifying the properties of the foams. The use of polyurethane solutions is particularly advantageous in those cases where a standard foam formulation results in a too open cell structure tending to lead to collapse of the foam. The modification according to the invention improves the stability of the foam to a remarkable degree. Polyurethane foams produced in accordance with the invention are also distinguished by their improved compression resistance. When preparing the reactive mixture which is to be foamed, it is preferred according to the invention to add the solution according to the invention as the last component because if it comes into contact with the other reactants too soon (in particular the polyether polyols, which always contain substantial quantities of water), the dissolved polyadducts tend to precipitate from the solution. Electron microscopic investigations have shown that if this measure is observed, the foams obtained do not contain any particles of filler of the kind found in the previously mentioned polyurea or polyhydrazo dicarbonamide dispersions in higher molecular weight polyhydroxyl compounds.

Water and/or readily volatile organic substances are used as blowing agents in the production of polyurethane foams in accordance with the invention. Suitable organic blowing agents include for example, acetone, ethyl acetate, halogenated alkanes such as methylene chloride, chloroform, ethylene chloride, vinylidene chloride, monofluorotrichloromethane, chlorodifluoromethane or dichlorofluoromethane, or also butane, hexane, heptane or diethyl ether. The effect of a blowing agent can also be obtained by the addition of compounds which decompose at temperatures above room temperature to liberate gases such as nitrogen, e.g. azo compounds such as azoisobutyric acid nitrile. Other examples of blowing agents and details concerning the use of blowing agents may be found in Kunstsoff Handbuch, Volume VII, published by Vieweg and Höchtlen, Carl-Hanser Verlag, Munich 1966, e.g. on pages 108 and 109, 453 to 455 and 507 to 510.

Catalysts are also frequently used according to the invention. The catalysts added may be known per se, for example tertiary amines such as triethylamine, tributylamine N-methylmorpholine, N-ethylmorpholine, N-cocomorpholine, N,N,N',N'-tetramethylethylenediamine, 1,4-diazabicyclo-(2,2,2)-octane, N,-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole. Mannich bases known per se obtained from secondary amines such as dimethylene and aldehydes, preferably formaldehyde, or ketones such as acetone, methyl ethyl ketone or cyclohexanone and phenols such as phenol, nonylphenol or bisphenol may also be used as catalysts.

Examples of catalysts which consist of tertiary amines having hydrogen atoms which are reactive with isocyanate groups include triethanolamine, triisopropanolamine, N-methyl-diethanolamine, N-ethyl-diethanolamine, N,N-dimethyl ethanolamine and their reaction products with alkylene oxides such as propylene oxide and/or ethylene oxide.

Silaamines having carbon-silicon bonds as described e.g. in German Pat. No. 1,229,290 (corresponding to U.S. Pat. No. 3,620,984) may also be used as catalysts, e.g. 2,2,4-trimethyl-2-silamorpholine or 1,3-diethylaminomethyl-tetramethyl-disiloxane.

Basic nitrogen compounds such as tetraalkylammonium hydroxides, alkali metal hydroxides such as sodium hydroxide, alkali metal phenolates such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds.

The organic tin compounds used are preferably tin (II) salts of carboxylic acids such as tin (II) acetate, tin (II) octoate, tin (II) ethyl hexoate and tin (II) laurate and tin (IV) compounds such as dibutyl tin oxide, dibutyl tin dichloride, dibutyl tin diacetate, dibutyl tin dilaurate, dibutyl tin maleate or dioctyl tin diacetate. All the above mentioned catalysts may, of course, be used as mixtures.

Further examples of catalysts which may be used according to the invention and details concerning the activity of the catalysts are given in Kunstsoff-Handbuch Volume VII, published by Vieweg and Höchtlen, Carl-Hanser-Verlag, Munich 1966, e.g. on pages 96 to 102.

The catalysts are generally used in a quantity of between about 0.001 and 10% by weight, based on the quantity of compounds with a molecular weight of from 400 to 10,000 which have at least two hydrogen atoms capable of reacting with isocyanates.

Surface active additives such as emulsifiers and foam stabilizers may also be used according to the invention. Suitable emulsifiers include e.g. the sodium salts of ricinoleic sulphonates or salts of fatty acids with amines such as oleic acid diethylamine or stearic acid diethanolamine. Alkali metal or ammonium salts of sulphonic acids such as dodecylbenzenesulphonic acid or dinaphthylmethane disulphonic acid or of fatty acids such as ricinoleic acid or of polymeric fatty acids may also be used as surface active additives.

Suitable foam stabilizers are particularly the polyether siloxanes, and especially those which are water-soluble. These compounds generally have a polydimethyl siloxane group attached to a copolymer of ethylene oxide and propylene oxide. Foam stabilizers of this kind have been described, for example, in U.S. Pat. Nos. 2,834,748; 2,917,480 and 3,629,308.

Other additives which may also be used according to the invention include reaction retarders, e.g. substances which are acid in reaction such as hydrochloric acid or organic acid halides; cell regulators known per se such as paraffins or fatty alcohols or dimethyl polysiloxanes; pigments; dyes; flame retarding agents known per se such as tris-chloroethylphosphate, tricresyl phosphate or ammonium phosphate and polyphosphate; stabilizers against ageing and weathering; plasticizers; fungistatic and bacteriostatic substances; and fillers such as barium sulphate, kieselguhr, carbon black or whiting.

Other examples of surface active additives, foam stabilizers, cell regulators, reaction retarders, stabilizers, flame retarding substances, plasticizers, dyes, fillers and fungistatic and bacteriostatic substances which may be used according to the invention and details concerning the use and mode of action of these additives may be found in Kunstsoff-Handbuch, Volume VII, published by Vieweg and Höchtlen, Carl-Hanser-Verlag, Munich 1966, e.g. on pages 103 to 113.

According to the invention, the components are reacted together by the known one-shot prepolymer or semiprepolymer process, often using mechanical devices such as those described in U.S. Pat. No. 2,764,565. Details concerning processing apparatus, which may be found in Kunstsoff-Handbuch Volume VII, published by Vieweg and Höchtlen, Carl-Hanser-Verlag, Munich 1966, e.g. on pages 121 to 205.

According to the invention, the foaming reaction for producing foam products is often carried out inside molds. In this process, the foamable reaction mixture is introduced into a mold which may be made of a metal such as aluminum or a plastics material such as an epoxide resin, and it foams up inside the mold to produce the shaped product. This process of foaming in molds may be carried out to produce a product having a cellular structure on its surface or it may be carried out to produce a product having a compact skin and cellular core. According to the invention, the desired result can be obtained by either introducing just sufficient foamable reaction mixture to fill the mold with foam after the reaction or by introducing a larger quantity of reaction mixture than is necessary to fill the mold with foam.

The second method is known as "overcharging", a procedure which has already been disclosed, e.g. in U.S. Pat. Nos. 3,178,490 and 3,182,104.

So-called external mold release agents known per se, such as silicone oils, are frequently used when foaming is carried out inside molds. However, the process may also be carried out with the aid of so-called internal mold release agents, if desired in combination with external mold release agents, e.g. as disclosed in German Offenlegungsschriften Nos. 2,121,670 and 2,307,589.

Cold setting foams may also be produced according to the invention (see British Pat. No. 1,162,517 and German Offenlegungsschrift No. 2,153,086).

Foams may, of course, also be produced by the process of block foaming or by the laminator process known per se.

When the solutions according to the invention are used in polyurethane lacquer formulations, they give rise to transparent lacquers and coatings which are remarkably improved in their heat resistance and weathering resistance when compared with lacquers based on unmodified polyols. The known modified polyhydroxyl compounds, in which high molecular weight products are dispersed in a finely divided form, are unsuitable for this purpose because they give rise to cloudy lacquers and coatings. Highly elastic, transparent polyurethane elastomers can also be produced in accordance with the invention.

The following Examples serve to illustrate the present invention. The figures given represent parts by weight or percentages by weight unless otherwise indicated.

EXAMPLE 1

35% PHD (polyhydrazodicarbonamide) solution in ethylene glycol.

Index=(NCO/NH) . 100=100

Formulation:
5070 parts of monoethylene glycol as solvent;
670 parts of hydrazine monohydrate (99%);
2310 parts of tolylene diisocyanate (ratio of 2,4- and 2,6-isomers=4:1), hereinafter referred to as diisocyanate T 80;
Water content: 3.1%, based on the anhydrous solution.

Method of operation:

The solvent and hydrazine are introduced at room temperature into a stirrer vessel equipped with water cooling and distillation attachment. The diisocyanate is introduced slowly while the reaction temperature is kept at 25° C. by cooling. A finely divided dispersion of PHD in ethylene glycol is initially obtained. This changes into a clear solution towards the end of distillation of the water of hydration under reduced pressure at 25° to 60° C. The anhydrous 35% (20%; 10%) solution has a viscosity at 25° C. of 5820 cP (490 cP; 150 cP).

When a small quantity of water is added to the solution, the PHD precipitates in the form of a finely divided, stable dispersion.

EXAMPLE 1a

Example 1 is repeated but at a reaction temperature of from 75° to 100° C. The anhydrous solution obtained has a viscosity of about between 40,000 and 70,000 cP at 25° C. and 15 000 to 20 000 cP at 50° C.

EXAMPLE 1b

A polyhydrazodicarbonamide powder prepared in toluene from equivalent quantities of hydrazine and diisocyanate T 80 is filtered and after complete removal of toluene is dissolved in monoethylene glycol at 125° C. with stirring.

The 20% solution has a viscosity of 120 cP at 25° C.

EXAMPLE 2

34.7% PHD solution in diethylene glycol. Index=100.
Formulation:
5070 parts of diethylene glycol as solvent;
660 parts of hydrazine monohydrate (99%);
2274 parts of diisocyanate T 80;
Water content: 3.1%, based on anhydrous solution.

The method is the same as in Example 1. The anhydrous solution obtained at a concentration of 34.7% (20%; 10%) has a viscosity at 25° C. of 28,500 cP (1800 cP; 420 cP).

EXAMPLE 2a

Example 2 is repeated with the quantity of isocyanate increased by 10% so that the index (NCO/NH).100 is 110. The resulting anhydrous solution diluted to 20% has a viscosity of 775 cP/25° C.

EXAMPLE 2b

Example 2 is repeated but with the quantity of isocyanate required to increase the index to 160. A finely divided dispersion having a viscosity of 900 cP/25° C. at a solids concentration of 20% is obtained. It does not become homogeneous even when heated to 150° C.

EXAMPLE 3

35% solution of polyhydrazodicarbonamide-bis-(hydroxyethyl urea) in monoethylene glycol.
NCO/NH=1.0; NCO/(NH+OH)=0.91.
Formulation:
4340 parts of monoethylene glycol;
505 parts of hydrazine monohydrate;
106 parts of diethanolamine;
1827 parts of 2,4-tolylene diisocyanate;
water content: 2.8%, based on anhydrous solution.

The method is the same as in Example 1. The 35% (20%; 10%) solution obtained has a viscosity of 7320 cP (580 cP; 170 cP) at 25° C.

EXAMPLE 3a

If the polyaddition reaction described in Example 3 is carried out in 1,4-butanediol instead of in diethylene glycol, the product obtained, although a paste at room temperature, is a clear solution at temperatures above 120° C.

EXAMPLE 4

35% Anionic polyurea solution in diethylene glycol.
Index=100; anion equivalent content=0.27/100 g of solids.
Formulation:
696 Parts of diethylene glycol as solvent;
456 parts of a 44% aqueous solution of the diaminosulphonate of the formula $H_2N-CH_2-CH_2-NH-CH_2-CH_2-SO_3^{\ominus}Na^{\oplus}$ (hereinafter referred to as AAS salt solution);

174 parts of diisocyanate T 80;
Water content: 23.9% by weight based on anhydrous solution.
Reaction conditions:

The diisocyanate is introduced dropwise with stirring into the mixture of diethylene glycol and AAS salt solution at 20° to 50° C. and the water is then removed under reduced pressure at 50° to 80° C. The 35%, anhydrous solution obtained has a viscosity of 5800 cP at 25° C.

EXAMPLE 5

20% Solution of an anionic polyurea in diethylene glycol.
Index=100; anion equivalent content=0.23/100 g of solids.
Formulation:
1759 Parts of diethylene glycol;
408 parts of AAS salt solution;
250 parts of 4,4'-diphenylmethane diisocyanate;
Water content: 9.9% by weight, based on anhydrous solution.

The method is the same as in Example 4. The 20% solution obtained has a viscosity of 1460 cP at 25° C.

EXAMPLE 6

20% solution of an aliphatic, anionic polyurea in diethylene glycol.
Index=100; anion equivalent content=0.28/100 g of solids.

If the diisocyanate T 80 is replaced by an equivalent quantity of hexamethylene-1,6-diisocyanate and the method carried out as in Example 4, a solution having a viscosity of 430 cP/25° C. is obtained.

EXAMPLE 7

35% Anionic PHD polyurea solution in ethylene glycol.
Index=100; anion equivalent content=0.03/100 g of solids.
Formulation:
483 Parts of monoethylene glycol;
50.5 parts of hydrazine monohydrate (99%);
40 parts of the diaminosulphonate of the formula

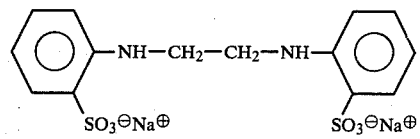

60 parts of water;
188 parts of diisocyanate T 80;
water content: 10.6% by weight of water, based on the anhydrous solution.
Reaction conditions:

A mixture of ethylene glycol, diaminosulphonate, hydrazine and water is introduced into the reaction vessel and the diisocyanate is added with stirring at 20° to 40° C. Distillation of the water under reduced pressure is then begun immediately, the temperature being raised to 75° C. towards the end. The 35%, anhydrous solution obtained has a viscosity of 1590 cP at 25° C.

EXAMPLE 8

20% Solution in diethylene glycol of an anionic polyhydrazodicarbonamide polyurea which has hydroxyl groups.
NCO/NH=1.0; NCO/(NH+OH)=0.91; anion equivalent content=0.03/100 g of solids.
Formulation:
1198 Parts by weight of diethylene glycol as solvent;
13.7 parts by weight of ethanolamine;
0.6 parts by weight of ethylene diamine;
45 parts by weight of diaminodisulphonate from Example 7;
50 parts by weight of hydrazine monohydrate (99%);
80 parts by weight of water;
209 parts by weight of diisocyanate T 80;
Water content: 6,5% by weight, based on the anhydrous solution.
The method is analogous to that of Example 7. The anhydrous 20% solution obtained has a viscosity of 690 cP at 25° C.

EXAMPLE 9

20% Aromatic bis-urea dispersion in monoethylene glycol.
Formulation:
416 Parts of monoethylene glycol;
68 parts of 25% aqueous ammonia solution;
87 parts of diisocyanate T 80;
Water content: 9.8% by weight, based on anhydrous solvent.
Method of procedure and reaction conditions:
Ethylene glycol and aqueous ammonia solution are introduced at room temperature (18° to 25° C.) into a stirrer vessel equipped with reflux condenser and diisocyanate T 80 is introduced directly into the liquid phase of the mixture with stirring so that the temperature rises to 50°–70° C. as a result of the exothermic polyaddition reaction. Distillation of water under reduced pressure can be begun as soon as all the isocyanate has been added.
The 20% bis-urea dispersion obtained is a highly viscous paste at 25° C.; the viscosity at 50° C. is 270 cP. A clear solution is obtained on heating to 130° C.

EXAMPLE 10

20% Solution of an aromatic bis-urea in monoethylene glycol.
Formulation:
1136 Parts of monoethylene glycol;
136 parts of 25% aqueous ammonia solution;
56 parts of water;
250 parts of 4,4'-diphenylmethane diisocyanate;
Water content: 11.1% by weight, based on the anhydrous reaction product and ethylene glycol.
Diphenylmethane diisocyanate heated to 90°–110° C. is introduced into the mixture of ethylene glycol and ammonia solution as described in Example 9 and water is then distilled off. A finely divided, stable, 20% dispersion is obtained.
A clear solution is obtained on heating to 130° C.

EXAMPLE 11

100 Parts by weight of a polyether of 83 mol percent of propylene oxide and 17 mol percent ethylene oxide (OH number 28) started on trimethylol propane;
2.5 parts by weight of water,
0.3 parts by weight of triethylene diamine;
1.0 parts by weight of a commercial polysiloxane stabilizer manufactured by Goldschmidt (B 3842);
0.4 parts by weight of diethanolamine;
2.0 parts by weight of trichloroethylphosphate and
4.0 parts by weight of a 27% solution described in Example 2 are mixed together.
The mixture is intimately stirred with 34.6 parts by weight of diisocyanate T 80. A creamy reaction mixture forms after 8 seconds. It has a rise time of 80 seconds and gel time of 85 seconds.
The resulting foam has the following mechanical properties:

| | | |
|---|---|---|
| Gross density according to DIN 53420 | 35 | Kg/m$^3$ |
| Tensile strength according to DIN 53571 | 80 | KPa |
| Elongation at break according to DIN 53571 | 170% | |
| Compression resistance according to DIN 53577 | 2.3 | KPa |
| Pressure deformation residue according to DIN 53572 | 11% | |
| (22 hours at 70° C. and 50% deformation) | | |

EXAMPLE 12

100 Parts by weight of the polyether from Example 11;
3.0 parts by weight of water;
0.2 parts by weight of triethylenediamine;
0.3 parts by weight of 2-dimethylamino-ethanol;
1.2 parts by weight of a commercial polysiloxane stabilizer manufactured by Goldschmidt (B 3842);
0.6 parts by weight of diethanolamine;
2.0 parts by weight of trichloroethylphosphate and
6.0 parts by weight of a 27% solution described in Example 2 are stirred together.
The mixture is intimately mixed with 42.15 parts by weight of diisocyanate. T 80. A creamy reaction mixture forms after 9 seconds. It has a rise time of 165 seconds and a gel time of 200 seconds.
The resulting foam has the following mechanical properties:

| | | |
|---|---|---|
| Gross density according to DIN 53420 | 32 | Kg/m$^3$ |
| Tensile strength according to DIN 53571 | 135 | KPa |
| Elongation at break according to DIN 53571 | 240% | |
| Compression resistance according to DIN 53577 | 2.3 | KPa |
| Fire resistance test ASTM D 1692-74 | 30 | mm/15 sec. |

EXAMPLE 13 (COMPARISON EXAMPLE)

100 Parts by weight of a polyether from Example 11;
2.5 parts by weight of water;
0.3 parts by weight of triethylenediamine;
1.0 parts by weight of a commercial polysiloxane stabilizer of Goldschmidt (B 3842);
0.4 parts by weight of diethanolamine and 2.0 parts by weight of trichloroethylphosphate are mixed together.
The mixture is intimately mixed with 33.7 parts by weight of diisocyanate T 80. A creamy reaction mixture forms but it soon collapses. No foam can be produced from this formulation.

EXAMPLE 14 (COMPARISON EXAMPLE)

100 Parts by weight of the polyether from Example 11;

2.5 parts by weight of water;
0.3 parts by weight of triethylenediamine;
1.0 part by weight of a commercial polysiloxane stabilizer of Goldschmidt (B 3842);
0.4 parts by weight of diethanolamine,
2.0 parts by weight of trichloroethylphosphate and
4.0 parts by weight of diethylene glycol are mixed together.

The mixture is stirred together with 40.1 parts by weight of diisocyanate T 80. The reaction mixture collapses and does not form a foam.

Comparison Examples 13 and 14 illustrate that no foam can be obtained without a polyfunctional low molecular weight alcohol (Example 13) or when low molecular weight polyfunctional alcohols are used exclusively (without dissolved solids).

EXAMPLE 15

30% PHD/PUR (polyurethane) solution in diethylene glycol;
Index = 100

The anhydrous PHD solution in diethylene glycol obtained according to Example 2 is mixed with the equivalent quantity of diisocyanate T 80 at 70° C. with vigorous stirring. After 1 to 2 minutes, the mixture is poured into molds to form layers 2 cm in thickness and left in a heating cupboard at 100° to 110° C. for 1 to 2 hours to undergo polyaddition into a high molecular weight, transparent polyhydrazocarbonamide-polyurethane glass.

When cooled to room temperature, the extremely hard product obtained is mechanically ground to a powder (particle size below 160 μm) and stirred into diethylene glycol at 20° to 25° C. The powdered glass dissolves to a completely clear solution within a few hours. The 30% solution has a viscosity at 25° C. of 920 cP.

EXAMPLE 16

30% PHD/PUR solution in diethylene glycol

When the anhydrous PHD solution in diethylene glycol obtained in Example 2 is reacted in a manner analogous to Example 15, not with diisocyanate T 80 but with the equivalent quantity of 4,4'-diphenylmethane diisocyanate, a polyurethane glass powder which dissolves in diethylene glycol at 100° to 120° C. to form a clear solution at a concentration of 30% is obtained.

What is claimed is:

1. A process for the preparation of clear, transparent, uniform and homogeneous polyhydric alcohol solutions of polyisocyanate polyaddition products with a solids content of 5 to 70% by weight in 30 to 95% by weight polyhydric alcohol solvent having a molecular weight between 62 and 200 comprising reacting:
   (A) polyisocyanates or isocyanate containing prepolymers of polyisocyanates and higher molecular weight and/or low molecular weight polyhydroxyl compounds in situ with
   (B) hydrazines and/or polyamines and/or dihydrazides and/or ammonia and optionally formaldehyde in
   (C) polyhydric alcohols having a molecular weight of between 62 and 200,
   optionally in the presence of water, and the water, if used, being subsequently removed in known manner.

2. A process according to claim 1 wherein isocyanate containing compounds (A) and aminofunctional compounds (B) are reacted in an equivalent ratio of from 0.50:1 to 1.50:1.

3. The process of claim 1, wherein said polyhydric alcohols are selected from the group consisting of ethylene glycol, diethylene glycol, propanediol and butanediol.

4. Clear, transparent, uniform and homogeneous polyhydric alcohol solutions of polyisocyanate polyaddition products with a solids content of from 5 to 70% by weight in 30 to 95% by weight polyhydric alcohol solvent having a molecular weight between 62 and 200, produced by the process comprising reacting:
   (A) polyisocyanates or isocyanate containing prepolymers of polyisocyanates and higher molecular weight and/or low molecular weight polyhydroxyl compounds in situ with
   (B) hydrazines and/or polyamines and/or dihydrazides and/or ammonia and optionally formaldehyde in
   (C) polyhydric alcohols having a molecular weight of between 62 and 200,
   optionally in the presence of water, and the water, if used, being subsequently removed in known manner.

* * * * *